United States Patent [19]

Richmond et al.

[11] 4,040,675
[45] Aug. 9, 1977

[54] ANTI-THEFT VEHICLE BRAKE-SUPERVISING DEVICE

[76] Inventors: Raymond Richmond, 249-20 Thornhill Ave., Little Neck, N.Y. 11362; Edward Parmer, 118 N. Waldinger St., Valley Stream, N.Y. 11580; Edward G. Parmer, Jr., 167 Caroline Ave., Garden City, N.Y. 11530

[21] Appl. No.: 708,920

[22] Filed: July 26, 1976

[51] Int. Cl.² .............................................. B60T 17/16
[52] U.S. Cl. ........................................ 303/89; 60/569; 137/495; 137/589; 137/625.34; 137/625.35; 188/353; 192/3 H
[58] Field of Search .................... 188/353; 303/89; 192/3 H; 137/598, 593.3, 593.6, 593.9, 508, 495, 625.34, 625.35, 625.36; 60/568, 569

[56] References Cited

U.S. PATENT DOCUMENTS

| | | | |
|---|---|---|---|
| 3,298,471 | 1/1967 | Evans | 188/353 |
| 3,410,610 | 12/1968 | Cumming | 303/89 X |
| 3,625,573 | 12/1971 | Conn | 303/89 |
| 3,973,803 | 8/1976 | Seward et al. | 303/89 |

FOREIGN PATENT DOCUMENTS

| | | | |
|---|---|---|---|
| 694,541 | 7/1953 | United Kingdom | 188/353 |

*Primary Examiner*—George E. A. Halvosa
*Attorney, Agent, or Firm*—Bauer, Amer & King

[57] ABSTRACT

A vehicle anti-theft device which maintains the braking function of the braking fluid by preventing reverse flow thereof from the wheel cylinder back to the master cylinder until, following an authorized procedure, an interconnecting fluid passage is moved into a strategic position which allows this reverse flow. As an improvement over the prior art, the direction of application of the braking fluid is arranged to assist, rather than impede, the strategic positioning of the aforesaid interconnecting fluid passages as well as contribute to other noteworthy advantages in the operation of the within device.

4 Claims, 6 Drawing Figures

ANTI-THEFT VEHICLE BRAKE-SUPERVISING DEVICE

The present invention relates generally to a vehicle anti-theft device, and more particularly to an improved device of the type that advantageously uses the vehicle braking fluid to prevent its movement, unless by an authorized user.

Braking fluid-supervising devices for anti-theft purposes are already well known, as exemplified by the devices of U. S. Pats. Nos. 3,559,755, 3,515,442, 3,617,100, 3,617,663 and 3,653,730. In principle, the flow passage between the vehicle master and wheel cylinders is blocked by a one-way valve, and thus upon application of the brake, the brake fluid flows in the permitted direction through the valve into the wheel cylinder to immobilize the vehicle, but cannot reverse its flow unless a security device, such as a lock or the like, is operated to unblock the one-way valve. Known devices utilizing this principle are not entirely satisfactory because of one or more shortcomings. If the one-way valve is closed electrically, a malfunction could produce a seal that prevents even directional flow into the wheel cylinder, thus leaving the vehicle, conceivable while it is in motion, without brakes. This dictates manually establishing the one-way valve function, except that the pressure build-up downstream of the valve, which must be sufficient to immobilize the vehicle, also renders it difficult to manually urge the various components through their required movements as when the valve must be opened, and thus manual operation has not been a totally satisfactory alternative to electrical operation.

Broadly, it is an object of the present invention to provide an improved braking fluid-type anti-theft device overcoming the foregoing and other shortcomings of the prior art. Specifically, it is an object to provide an effective manually- operating valve closing and opening device for a vehicle braking fluid system, so that selective use can be made of the vehicle braking function for security purposes.

An anti-theft vehicle brake-supervising device demonstrating objects and advantages of the present invention includes a flow chamber having opposite distal and proximal ends and a first and a second fluid connection respectively connected from said flow chamber distal end to said vehicle master cylinder and from said flow chamber proximal end to said wheel cylinder so as to normally allow opposite direction fluid flow between said master cylinder and wheel cylinder through said flow chamber. A one-way valve is opertively disposed in the flow chamber distal end and in communication with both the master cylinder and wheel cylinder fluid connections and is effective to permit fluid flow only from the master cylinder into said wheel cylinder incident to utilizing the fluid to selectively immobilize said vehicle. Completing the within anti-theft device is a flow control member of a prescribed smaller size than said flow chamber and having sealing means at opposite ends extending into sealing contact with the flow chamber wall to thereby define an external flow passage of a prescribed longitudinal length and in encircling relation about the flow control member bounded at opposite ends by said sealing means. This flow control member is operatively arranged to be manually urged through movement in the flow chamber between two positions. In one position it is adjacent the proximal end of the flow chamber such that the external flow passage is in communication only with said wheel cylinder fluid connection. In its other position, it is adjacent the flow chamber distal end and the longitudinal length of its external flow passage is such as to extend also to the master cylinder fluid connection to thereby provide communication between said wheel cylinder and said master cylinder through said external flow passage thus resulting in the release of the fluid immobilizing said vehicle. In this way, the manual urging of the flow control member from the proximal end to the distal end of the flow chamber causes the release of the vehicle and this manual movement is aided by the pressure and the flow direction of the fluid returning to the master cylinder.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a front elevational view, in longitudinal section, illustrating a typical prior art construction which uses the hydraulic braking of the vehicle for an anti-theft function; the remaining FIGS. 2–6, respectively, are each longitudinal views, in section, which illustrate the improved anti-theft device according to the present invention in its various essential modes of operation.

In particular, FIG. 2 illustrates the cooperating positions of the various components of the device when it is not operative and the brakes are applied and released as a normal part of the operation of the vehicle. This figure also includes structural details, omitted in other figures, for brevity's sake, of an appropriate known security device or lock that is suggested for use with the within anti-theft device.

Figure 5:
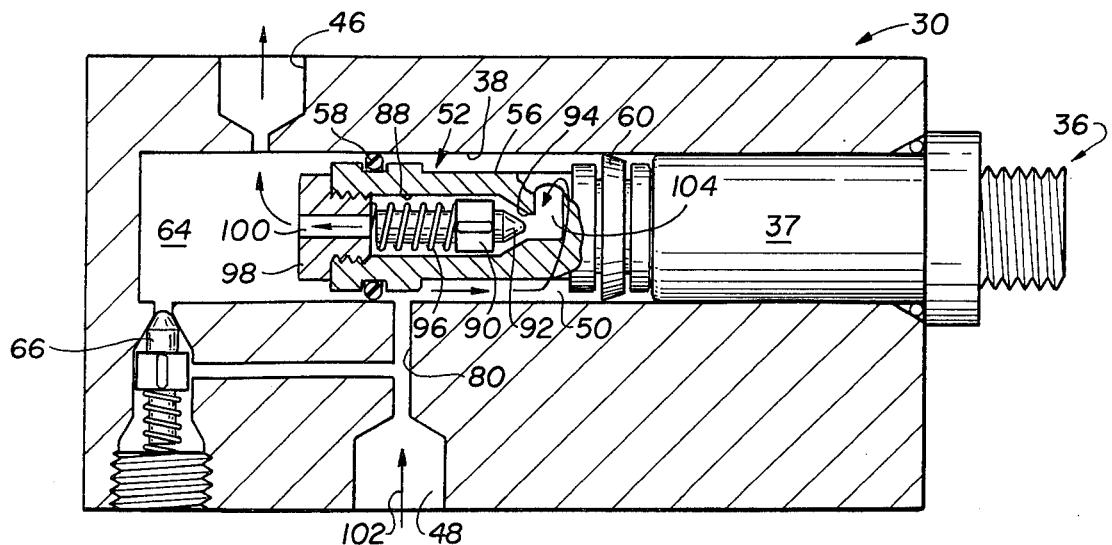
Figure 6:
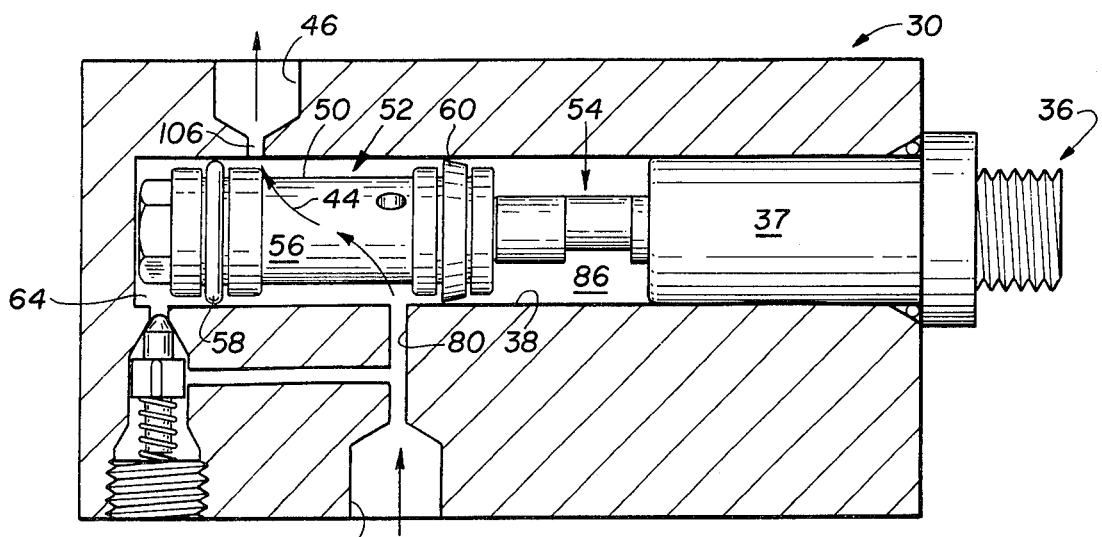

FIG. 5 illustrates the cooperative positions of the various components when the device is operative and it is necessary to allow for expansion by permitting controlled flow of the braking fluid out of one or more of the wheel cylinders back to the vehicle main cylinder, and yet maintain effective use of the braking fluid to prevent unauthorized movement of the vehicle; and FIG. 6 illustrates the cooperative positions of the various components in the device when placed back into their non-operative mode (similar to FIG. 2) resulting in the return of the braking fluid back to the vehicle master cylinder.

Figure 1:
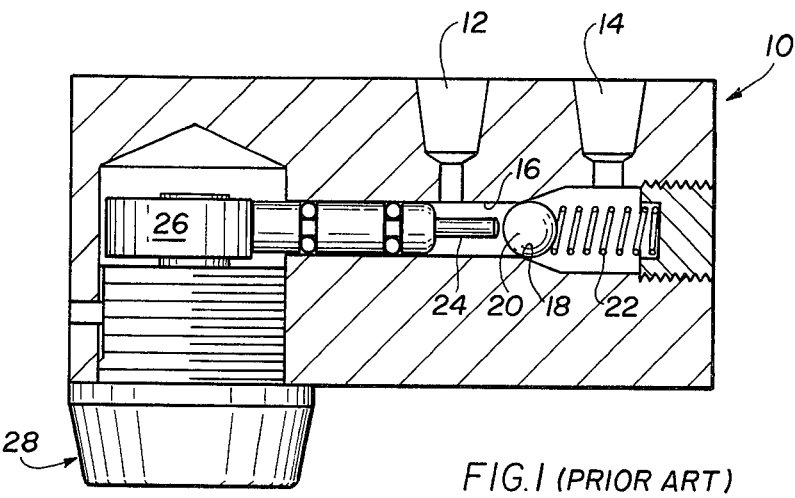

Reference is first made to FIG. 1 which illustrates a typical prior art construction of an anti-theft device generally designated 10, which attempts to advantageously use the hydraulic braking fluid of the vehicle to prevent unauthorized use of the vehicle. To this end, device 10 typically includes a fluid connection 12 to the master brake cylinder and a fluid connection 14 to at least one wheel cylinder. The flow passage 16 communicates with the connections 12, 14 and has a valve opening 18 with a cooperating ball valve 20 normally biased into a closed position by the biasing spring 22. Push rod 24 is actuated through movement by a rotary cam 26 to selectively unseat the ball 20 from the valve opening 18. The anti-theft device 10, as just described, is exemplified by the device of U.S. Pat. No. 3,515,442, to which reference should be made for a more detailed description. The description provided above suffices for present purposes.

Typical opertion of the prior art device 10 is one which contemplates actuating or applying the vehicle brakes which results in flow of the hydraulic fluid under pressure through the fluid connection 12 to the downstream side of the valve opening 18. Pressure of the hydraulic fluid will be understood to be sufficient to unseat the ball 20 from the valve opening 18 against the urgency of the biasing spring 22. Thus, the hydraulic fluid flows through the passage 16 and through the fluid connection 14 into at least one wheel cylinder in which it performs, in a well understood manner, a braking function and prevents movement of the vehicle. Valve 18, 20 will of course be recognized as a one-way valve, in that the hydraulic pressure downstream of the valve opening 18 together with the biasing spring 22 is effective in urging the ball valve 20 to close upon valve opening 18 and thereby prevent fluid flow from the wheel cylinder back to the master cylinder. Thus, under the circumstances just described, the vehicle cannot be theoretically moved until the ball 20 is unseated from valve opening 18 allowing the reverse flow of hydraulic fluid from the wheel cylinder through the fluid connection 14, flow passage 16, and back through the fluid connection 12 to the master cylinder. Thus, a lock or similar security device 28, which can be operated only by an authorized person, is provided and is effective in permitting operational movement of the cam 26 from its position illustrated in FIG. 1 into a position in which the cam 26 urges the push rod 24 through movement which results in unseating of the ball 20, and thus theoretically causes the release of the hydraulic fluid from the wheel cylinder. In actual practice, however, the device 10 is difficult to operate in the manner just described. Among other reasons, the hydraulic fluid requires a pressure on the order of 750 psi in order to prevent movement of the vehicle, and thus this same pressure is operating downstream against the ball 20 to prevent it from being unseated from the valve opening 18. As a practical matter, therefore, it is difficult to manipulate the cam 26 to cause unseating of the ball valve 20 and, in other respects as well, it is difficult to achieve proper functioning of the prior art anti-theft device 10.

Reference is now made to the within improved anti-theft device, generally designated 30, which overcomes the foregoing and other shortcomings of the prior art. Since device 30 will be described in its various positions of movement as depicted in FIGS. 2–6, respectively, the structual features that are related to the specific function that is illustrated will be described in connection with the specific figure, rather than the specification initially describing all of the structural features of the device 30 and then describing the functioning thereof.

Figure 2:
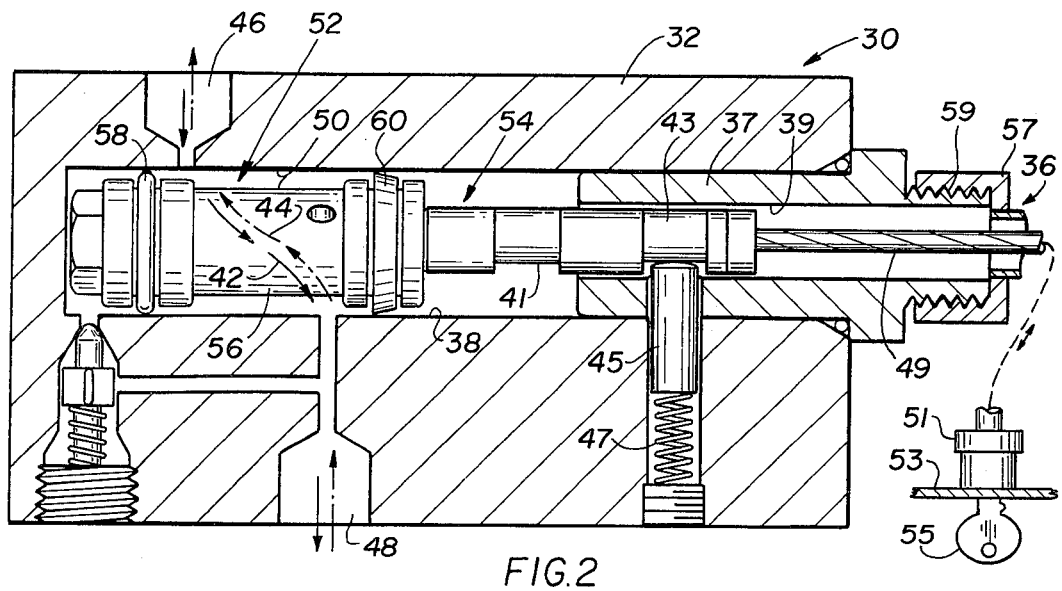
Figure 3:
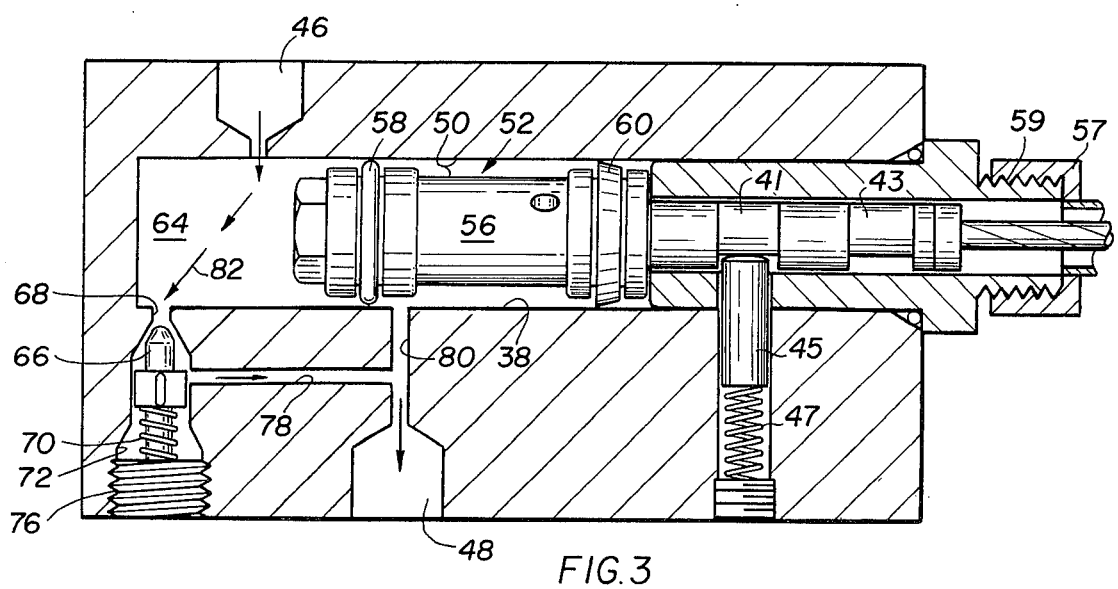
FIG. 3 illustrates the cooperative positions of the various components when the device is operative and the brake is applied, which forces the braking fluid of the vehicle from the master cylinder into one or more of the vehicle wheel cylinders.

Referring first to FIG. 2, device 30 is embodied in a block or similar-type member 32. Member 32, for security reasons, may be located remote from the dashboard, so that it is less susceptible to tampering. In a preferred embodiment, part of the security or lock mechanism, generally designated 36, which may be similar to any known or prior art mechanism, as exemplified by mechanism 28 of FIG. 1, includes a plug 37 with a central bore 39 located in a fixed position in the end of a machined opening 38 of member 32. Operating within plug 37 as part of the security mechanism 36 is a pushrod 54 having a first cam notch 41 and a second cam notch 43. In the FIG. 2 non-operative mode of device 30, the parameters of which will be subsequently disclosed in detail, a lock member 45 is biased by spring 47 into locking relation with the cam notch 43, thus holding the rod 54 against sliding movement within plug 37. However, a cable 49 is connected from rod 54 to a tumbler 51 appropriately mounted on the vehicle dashboard 53, so that upon insertion and rotation of a key 55, there is produced, via the cable 49, a corresponding rotation in the pushrod 54 which cams lock member 45 out of the notch 43. As is well understood, the twisting of cable 49 also shortens its length and thus draws rod 54 within the plug 37. Movement of rod 54 within plug 37 is illustrated in FIG. 3, in which it is also illustrated that lock member 45 then aligns with and drops into cam notch 41. Thus, the device 30 is held in its FIG. 3 position, which will be understood to provide it with its operative mode. To return device 30 to its FIG. 2 position, key 55 is merely rotated in the reverse direction, thereby camming member 45 out of notch 41 and causing expansion of the length of cable 49 and thus the pushing rod 54 back into its FIG. 2 position. For convenience in mounting, an outer housing 57 is threadably engaged to a threaded projection 59 of the plug 37.

Turning now to the inventive anti-theft device 30 hereof, and more particular to its non-operative mode as illustrated in FIG. 2, it will be noted that in this mode the braking fluid can readily flow in opposite directions 42 and 44 between the master cylinder and at least one wheel cylinder, or more particulrly between fluid connection 46 of the master cylinder and fluid connection 48 of a wheel cylinder. It is to be noted in particular that the opposite directional flow 42, 44 is achieved via a flow passage 50 which interconnects the fluid connections 46, 48, which flow passage is defined by a flow control member 52 when said flow control member 52 occupies the non-operative position illustrated in FIG. 2.

More particularly, the flow control member 52 which is generally cylindrically shaped as illustated in FIG. 2 is formed as part of the distal end of the previously noted pushrod 54 which extends through the security mechanism plug 37. As clearly illustrated in FIG. 2, the central medial portion of the flow control member 52, more particularly designated 56, is intentionally of a reduced diameter size in relation to the size of the flow passage 38 and, as a result, thereby provides the clearance between the outside diameter of the cylinder 56 and the passage 38 which results in the flow passage 50. Considered from a length-wise point of view, however, i.e. in an orientation of direction lengthwise of the flow control member 52, the opposite ends of the passage 50 are defined by an elastomeric ring 58 and a shaped sealing member 60, respectively mounted on opposite ends of the cylindrical body 56 of the flow control member 52, and each of which extends into sealing contact with the cylindrical wall which bounds the flow passage 38. As a consequence, in the non-operative position of the flow control member 52 as illustrated in FIG. 2, the flow passage 50 exists in an encircling relation about the cylindrical body 56 for a length which is defined by the spaced apart seals 58 and 60 and thus provides an interconnecting fluid connection between the fluid connections 46, 48, and thus between the master and wheel cylinders. Thus, in the non-operative position of the anti-theft device 30 shown in FIG. 2, when the vehicle operator presses down on the brake, the braking fluid flows along the flow path 42 to the wheel cylinder, and when the brake is released, a reverse flow 44 occurs and the hydraulic fluid merely returns to the master cylinder. This, of course, is as it should be since the device 30 is in its inoperative mode when occupying the position depicted in FIG. 2.

Let it now be assumed, however, that the operator of the vehicle places the device 30 into its operative mode in which it is intended to function as an anti-theft device to minimize or prevent theft of the vehicle by preventing unauthorized movement thereof. Referring to FIG. 3 again, this is achieved by the operator moving the flow control number 52 from the distal end to the proximal end of the flow passage 38. In actual practice, the operator will operate the security mechanism 36, as already explained, which results in withdrawal of the pushrod 54 within the plug 37 and thus the assumption of the FIG. 3 position by the device 30. As clearly shown in FIG. 3, this carries sealing ring 58 into an interposed position between the fluid connections 46 and 48 and thereby effectively interrupts the communication between these fluid connections. Or, stated another way, the external flow passage 50 of the flow control member 52 in the operative FIG. 3 position of the anti-theft device 30 hereof is only in communication with the wheel cylinder fluid connection 48. With the anti-theft device 30 in its FIG. 3 position, when the operator of the vehicle presses the brake pedal this has the effect of forcing the brake fluid from the master cylinder through the fluid connection 46 into the distal end 64 of the flow passage 38. Since, as already noted, fluid flow from the distal end 64 into the fluid connection 48 is cut off by the sealing ring 58, the pressure build up is then effective in causing the unseating of a one-way valve 66 from its valve opening 68. This unseating movement of one-way valve 66 is against the urgency of a return spring 70 and is of course in accordance with a normal and well understood manner in which one-way valves operate. For completeness sake, it is noted that the one-way valve 66 is operatively disposed in a machined opening 72 provided to accommodate this valve, and is closed against fluid leakage by the treaded engagement of a threaded bolt length portion 76 disposed in this opening. Upon the unseating of the valve 66, the high pressure braking fluid flows through the valve opening 68 and through a bypass passageway 78 which intersects the inlet passage 80 to the fluid connection 48. In this manner, the high pressure fluid flows via the flow path 82 from the master cylinder into the wheel cylinder, and thus is effective in immobilizing the vehicle. In the above connection, and as is clearly illustrated in FIG. 4 to which reference is not made, when the operator releases the vehicle brake pedal, the return spring 70 biases the valve 66 backs into its normal position closing the valve opening 68.

As a consequence, the braking fluid, under pressure, which is in the wheel cylinder and which effectively immobilizes the vehicle, is prevented from flowing in a reverse direction out of the wheel cylinder past the valve 66. This high pressure braking fluid also cannot bypass the sealing ring 58, and thus it can be characterized as being effectively trapped in the flow passage 50 of the flow control number 52. At this point in the description it is convenient to note that the pressure fluid in the flow passage or chamber 50 in the FIG. 4 position of the anti-theft device 30 exerts pressure in the direction 84 which, of course, is from the proximal end 86 of the flow passage 38 towards the previously noted distal end 64. Thus, direction 84 is one which facilitates the manual movement of the anti-theft device 30 from its operative to its non-operative mode, all as will be subsequently explained in connection with FIG. 6.

Figure 4:
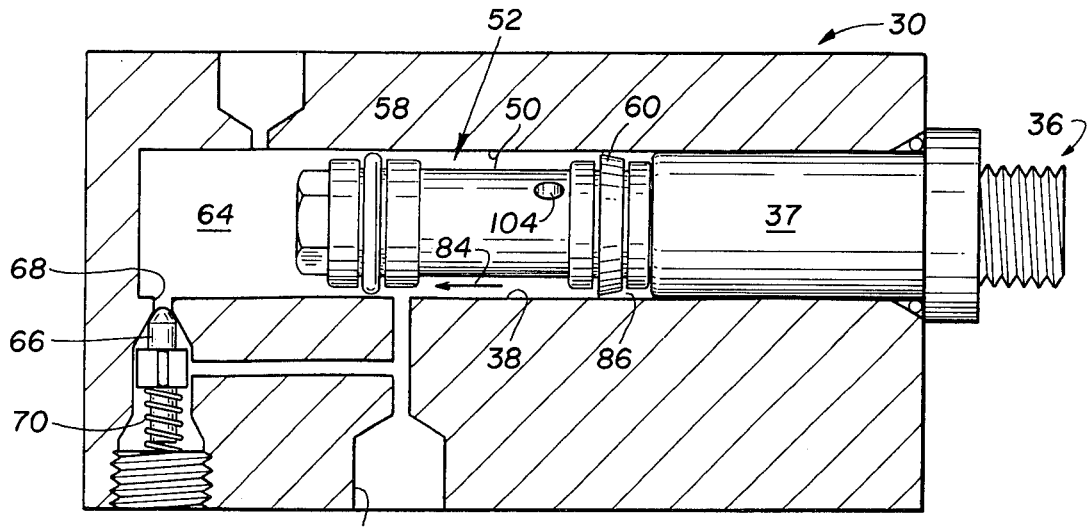
FIG. 4 illustrates the cooperating positions of the various components when the device is operative and the braking fluid of the vehicle is effectively being utilized to prevent unauthorized movement of the vehicle, or in other words, to provide an anti-theft function according to the present invention.

Still assuming, however, that the vehicle is immobilized in the operative FIG. 4 position of the anti-theft device 30, to better understand a further operating parameter of the device 30 reference should be made to FIG. 5 which also illustrates the operative mode of the device. As is further illustrated in FIG. 5, however, the cylindrical body 56 of the flow control device 52 is machined to include an internal flow passage 88. Operatively arranged in the flow passage 88 is a one-way valve 90, the nose head 92 of which is normally seated across, and thus closes, the valve opening 94. Assisting it in this is a spring 96 which at its remote end is seated for support on a closure plug 98 which includes a centrally mounted throughbore 100. The major reason for the one-way valve 90 is to permit, when necessary, the release of excess pressure braking fluid from the wheel cylinder without necessarily releasing a significant amount thereof that will permit movement of the vehicle. While this excess pressure in the braking fluid may occur for a number of reasons, the major reason could be a rise in ambient temperature which correspondingly results in expansion, and thus an increase in the volume of the braking fluid which must be relieved or else the conduits from the wheel cylinder or similar structure will rupture. Thus a control flow 102 of braking fluid is permitted through the fluid connection 48, passage 80, and into the flow passage 50. Upon reaching flow passage 50, the pressure fluid then enters through an opening 104 machined in the cylindrical body 56 and effectively exerts sufficient pressure against the valve nose 92 to push it off of the valve opening 94. In this manner the controlled flow of pressure fluid continues past the valve 90 and through the exit passage 100 into the distal end 64 of the passage 38. Upon gaining entrance into the distal end 64, the pressure fluid takes the path of least resistance, which is through the fluid connection 46 into the master cylinder, rather than past the then closed one-way valve 66. In this manner the braking fluid, or at least a portion contributing to an excess pressure, is returned to the master cylinder.

Attention is now directed to FIG. 6 which illustrates the manner in which the anti-theft device 30 is moved into its non-operative mode or, stated another way, is returned to its operative position as depicted in FIG. 2 in which the entire or a substantial body of the braking fluid in the wheel cylinder is returned to the master cylinder. To effectuate this, again it is assumed that the operator effectively operates the security lock or mechanism 36 which causes linear movement in the rod 54 out of the plug 37. This, in effect, manually actuates the anti-theft device 30 through movement which more particularly results in the movement of the flow control number 52 from in its position located in the proximal end 86 of the flow passage 38 to its position located in the distal end 64 thereof. Once attaining this position, as clearly illustrated in FIG. 6, the length of the flow passage 50 of the cylindrical body 56 is sufficiently long to extend the reach of the passage 50 from the passage 80 associated with the fluid connection 48 to the counterpart passage 106 associated with the fluid connection 46. Since the flow passage 50 spans the distance between the passages 80, 106, it necessarily follows that communication is restored between the fluid connection 48 and the fluid connection 46. As a consequence, the braking fluid in the wheel cylinder follows the exiting flow path 44 noted previously in connection with the description of FIG. 2 and thus is returned to the master cylinder. Naturally, when the braking fluid empties from the wheel cylinder, as just described, the vehicle is no longer immobilized and can therefore be utilized as intended. The movement of the flow control member 52 from its operational into its non-operational mode is of course facilitated by the pressure of the braking fluid and also its direction of flow from the wheel cylinder through connection 48 to the master cylinder fluid connection 46 since these directions coincide.

From the foregoing comments it should be readily appreciated that there has been described herein a noteworthy vehicle brake-supervising device which minimizes theft and which is not vulnerable to prior art shortcomings. Specifically, device 30 is manually shifted or actuated into its operative position initially closing the flow passage of the hydraulic fluid, as distinguished from being shifted by a solenoid or the like, so that there is no possibility of so tightly sealing the flow passage against flow, as might occur with a solenoid malfunction. Nevertheless, even though manually operated, it is relatively simple to actuate the device hereof back and forth between its operative positions since the pressure head of the braking fluid does not oppose these required movements in the device.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. An anti-theft vehicle brake-supervising device of the type which selectively prevents reverse flow of a fluid from at least one vehicle wheel cylinder back to the vehicle master cylinder to thereby maintain the braking function of said fluid within said wheel cylinder, the improvement comprising wall means defining a cylindrical flow chamber of a prescribed diameter having opposite distal and proximal ends, a first fluid connection connected from said flow chamber distal end to said vehicle master cylinder, a second fluid connection connected from said flow chamber proximal end to said vehicle wheel cylinder, said first and second fluid connections cooperating to normally allow opposite direction fluid flow between said master cylinder and wheel cylinder through said flow chamber, a bypass passageway connected between said distal end of said flow chamber and said second fluid connection having a one-way valve operatively disposed therein effective to permit fluid flow only from said master cylinder into said wheel cylinder incident to utilizing said fluid to selectively immobilize said vehicle, and a cylindrically shaped flow control member having a medial portion of a prescribed smaller radius size than said cylindrical flow chamber and having enlarged diameter portions with sealing means thereon at opposite ends extending into sealing contact with said flow chamber wall to thereby define an external flow passage of a prescribed longitudinal length and in encircling relation about said cylindrical flow control member bounded at opposite ends by said sealing means, said cylindrical flow control member being operatively arranged to be manually urged through movement in said flow chamber between an operative position adjacent said proximal end thereof in which said external flow passage is in communication only with said wheel cylinder fluid connection and an operative position adjacent said flow chamber distal end in which the longitudinal length of said external flow passage extends also to said master cylinder fluid connection to thereby provide communication between said wheel cylinder and said master cylinder through said external flow passage incident to the release of said fluid immobilizing said vehicle, whereby the manual urging of said cylindrical flow control member from said proximal end to said distal end of said flow chamber to cause the release of said vehicle is aided by the pressure and flow direction of said fluid returning to said master cylinder.

2. An improved anti-theft vehicle brake-supervising device as claimed in claim 1 wherein said sealing means on the distal end of said flow control member is an elastomeric sealing ring, to thereby facilitate the movement thereof over the opening defining said fluid connection to said master cylinder.

3. An improved anti-theft vehicle brake-supervising device as claimed in claim 1 including means in said flow control member defining an internal flow passage having a pressure release valve opening, and a one-way valve normally closing said pressure release valve opening and movable therefrom in the direction towards said flow chamber distal end in response to a pressure build-up in said flow chamber proximal end, to thereby release pressure fluid from said flow chamber proximal end through said pressure release valve opening into said distal end thereof, and thence into said vehicle master cylinder.

4. An improved anti-theft vehicle brake-supervising device as claimed in claim 3 wherein said internal flow passage of said flow control member is closed by a threadable plug, thereby to provide access to said one-way valve.

* * * * *